(12) United States Patent
Cross et al.

(10) Patent No.: US 12,253,050 B2
(45) Date of Patent: Mar. 18, 2025

(54) COMBINED CYCLE PROPULSION SYSTEM FOR HYPERSONIC FLIGHT

(71) Applicant: General Electric Company, Schenectady, NY (US)

(72) Inventors: Arin Elspeth Lastufka Cross, Waterford, NY (US); Krishnakumar Venkatesan, Clifton Park, NY (US)

(73) Assignee: GENERAL ELECTRIC COMPANY, Evendale, OH (US)

( * ) Notice: Subject to any disclaimer, the term of this patent is extended or adjusted under 35 U.S.C. 154(b) by 0 days.

(21) Appl. No.: 17/658,903

(22) Filed: Apr. 12, 2022

(65) Prior Publication Data
US 2023/0323809 A1    Oct. 12, 2023

(51) Int. Cl.
*F02K 7/16*     (2006.01)
*F02C 6/00*     (2006.01)
(Continued)

(52) U.S. Cl.
CPC .............. *F02K 7/16* (2013.01); *F02C 6/00* (2013.01); *F02C 6/08* (2013.01); *F02C 7/042* (2013.01); *F02C 7/057* (2013.01); *F02C 7/18* (2013.01); *F02K 1/06* (2013.01); *F02K 7/14* (2013.01); *F02K 7/20* (2013.01); *F23R 7/00* (2013.01);
(Continued)

(58) Field of Classification Search
CPC .......... F02C 9/40; F02C 6/08; F02C 5/00–12; F02K 7/02; F02K 7/075; F02K 7/14–20; F02K 1/002–18; F02K 1/36; F02K 1/40–44; F02K 1/54–07; F02K 7/16; F23R 3/18; F23R 3/343; F23R 3/346;
(Continued)

(56) References Cited

U.S. PATENT DOCUMENTS 3,161,018 A * 12/1964 Pierre ...................... F02K 7/16
                                                    60/262
9,816,463 B2   11/2017 Falempin et al.
(Continued)

FOREIGN PATENT DOCUMENTS

CN    109139295 B    9/2019
CN    108757179 B    12/2019
(Continued)

OTHER PUBLICATIONS

Rui Zhou et al., "Progress of continuously rotating detonation engines", Chinese Journal of Aeronautics, 2016, pp. 15-29.
(Continued)

*Primary Examiner* — Stephanie Sebasco Cheng
(74) *Attorney, Agent, or Firm* — Venable LLP; Edward A. Kmett; Michele V. Frank

(57) ABSTRACT

A combined cycle propulsion system for a flight vehicle includes a compressor-fed combustion engine, and a multi-mode supersonic engine. The multi-mode supersonic engine includes an adjustable inlet section, a combustion section arranged downstream of the adjustable inlet section and including a first combustor portion having at least one rotating detonation combustor and a second combustor portion having a supersonic combustion type combustor, and an adjustable exhaust nozzle section arranged downstream of the combustion section. The at least one rotating detonation combustor functions as a pilot for the supersonic combustion type combustor.

11 Claims, 11 Drawing Sheets

(51) Int. Cl.
*F02C 6/08* (2006.01)
*F02C 7/042* (2006.01)
*F02C 7/057* (2006.01)
*F02C 7/18* (2006.01)
*F02K 1/06* (2006.01)
*F02K 7/14* (2006.01)
*F02K 7/20* (2006.01)
*F23R 7/00* (2006.01)

(52) U.S. Cl.
CPC .... *F05D 2220/323* (2013.01); *F05D 2220/80* (2013.01); *F05D 2240/35* (2013.01)

(58) Field of Classification Search
CPC ........ F23R 3/38; F23R 7/00; B64D 2027/026; F05D 2220/80
See application file for complete search history.

(56) References Cited

U.S. PATENT DOCUMENTS

| | | | |
|---|---|---|---|
| 10,690,089 B2 * | 6/2020 | Robinson | F02K 9/97 |
| 10,704,466 B2 * | 7/2020 | Dierksmeier | F02C 7/14 |
| 10,969,107 B2 | 4/2021 | Rickey et al. | |
| 11,105,511 B2 | 8/2021 | Rathay et al. | |
| 11,149,954 B2 | 10/2021 | Tangirala et al. | |
| 2004/0128977 A1 | 7/2004 | Wilson et al. | |
| 2008/0283677 A1 | 11/2008 | Pederson et al. | |
| 2012/0159925 A1 * | 6/2012 | Duge | F02K 7/16 60/226.3 |
| 2019/0242582 A1 | 8/2019 | Johnson et al. | |
| 2019/0264917 A1 * | 8/2019 | Pal | F02K 7/10 |
| 2019/0309951 A1 * | 10/2019 | Joshi | F23R 3/286 |
| 2019/0338664 A1 | 11/2019 | Kozhevnikov | |
| 2019/0360695 A1 | 11/2019 | Johnson et al. | |
| 2020/0191398 A1 | 6/2020 | Rathay et al. | |
| 2020/0386189 A1 | 12/2020 | Powell et al. | |
| 2021/0140641 A1 | 5/2021 | Singh et al. | |

FOREIGN PATENT DOCUMENTS

| | | | |
|---|---|---|---|
| CN | 109184953 B | | 1/2020 |
| CN | 108708788 B | | 7/2021 |
| CN | 113882968 A | * | 1/2022 |
| FR | 1130131 A | * | 7/1955 |
| GB | 774059 A | * | 5/1957 |
| RU | 2524591 C1 | | 7/2014 |

OTHER PUBLICATIONS

Pratt & Whitney J58, https://en.wikipedia.org/wiki/Pratt_%26_Whitney_J58, as viewed on Dec. 27, 2021.
Scramjet Propulsion, https://www.grc.nasa.gov/www/BGH/scramjet.html, as viewed on Dec. 27, 2021.
Scott Manley, "What Is A Rotating Detonation Engine—And Why Are They Better Than Regular Engines", May 11, 2020 https://www.youtube.com/watch?v=rG_Eh0J_4_s&t=274s.
Kate McAlpine, "Rotating Detonation Engine: The Old Is New Again", Mar. 30, 2017.

* cited by examiner

COMBINED CYCLE PROPULSION SYSTEM FOR HYPERSONIC FLIGHT

TECHNICAL FIELD

The present disclosure relates to a combined cycle propulsion system for a flight vehicle.

BACKGROUND

Some conventional supersonic aircraft have been known to include a ramjet engine for achieving supersonic flight speeds, while other types of aircraft may include a scramjet engine for achieving even higher supersonic or hypersonic flight speeds. Both a ramjet engine and a scramjet engine rely on the forward momentum of the aircraft to provide an airflow into an inlet duct at supersonic speeds, where the inlet duct compresses the supersonic airflow using shock waves. The ramjet engine generally includes an isolator downstream of the inlet duct through which the compressed airflow from the inlet passes before being fed to a combustor of the ramjet engine. The isolator may reduce the speed of the inlet airflow to sub-sonic speeds so that the combustion in a combustion chamber of the ramjet engine occurs at sub-sonic speeds. The combustion products from the ramjet engine combustor are then exhausted through a nozzle so that the speed of the aircraft is increased. A scramjet engine similarly has an inlet duct in which a supersonic airflow is input, and the compressed airflow passes through an isolator before being fed to scramjet combustor. The combustion in the scramjet engine then occurs in a supersonic flow of the inlet air in the combustor of the scramjet engine.

BRIEF DESCRIPTION OF THE DRAWINGS

Features, advantages, and embodiments of the present disclosure will be apparent from the following, more particular, description of various exemplary embodiments, as illustrated in the accompanying drawings, wherein like reference numbers generally indicate identical, functionally similar, and/or structurally similar elements.

DETAILED DESCRIPTION

Figure 1:
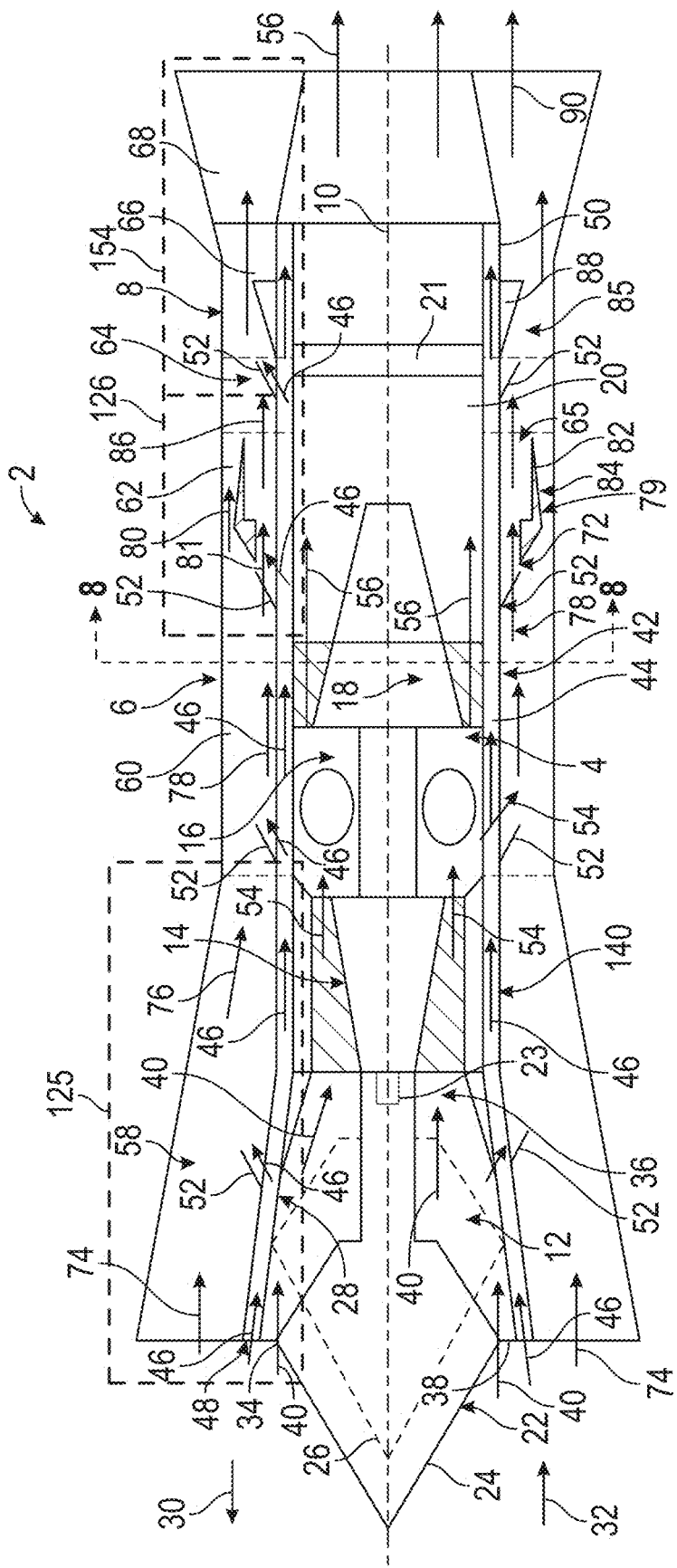
FIG. 1 is a schematic view of an exemplary combined cycle propulsion system, according to an embodiment of the present disclosure.

Various embodiments are discussed in detail below. While specific embodiments are discussed, this is done for illustration purposes only. A person skilled in the relevant art will recognize that other components and configurations may be used without departing from the spirit and the scope of the present disclosure.

As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

Various features, advantages, and embodiments of the present disclosure are set forth or apparent from a consideration of the following detailed description, drawings, and claims. Moreover, it is to be understood that the following detailed description is exemplary and intended to provide further explanation without limiting the scope of the disclosure as claimed.

Some conventional supersonic aircraft have been known to include a ramjet engine for achieving supersonic flight speeds, while other types of aircraft may include a scramjet engine for achieving even higher supersonic or hypersonic flight speeds. Both a ramjet engine and a scramjet engine rely on the forward momentum of the aircraft to provide an airflow into an inlet duct at supersonic speeds. The inlet duct compresses the airflow and the compressed airflow then passes through an isolator downstream of the inlet before being fed to a combustor of the ramjet engine. The isolator may also reduce the speed of the inlet airflow to sub-sonic speeds prior to combustion in a combustion chamber. The combustion products from the ramjet engine combustor are then exhausted through a nozzle, so that the speed of the aircraft is increased. A scramjet engine similarly has an inlet duct in which supersonic airflow is input and compressed via shockwaves generated within an isolator, and then flows through an isolator before being fed to a scramjet combustor. The combustion in the scramjet engine occurs in a supersonic flow of the inlet air to the combustor of the scramjet engine. One issue that arises with the scramjet engine is an unstart condition, in which the supersonic airflow breaks down, placing it outside the design envelope of the scramjet combustor. The unstart condition may more commonly occur at lower Mach numbers.

The present disclosure addresses the foregoing by providing a combined cycle propulsion system that includes compressor-fed combustion engine, and a multi-mode supersonic engine having a first combustion portion with a rotating detonation combustor (RDC), and a second combustion portion that includes a supersonic combustion type combustor, such as a scramjet combustor. The combustion products of the RDC in the first combustion portion may be utilized as a pilot source for the supersonic combustion type combustor. The inclusion of the RDC in the first combustion portion of the multi-mode supersonic engine allows for, more or less, a ramjet-type operation of the multi-mode supersonic engine. Once the aircraft reaches a particular flight speed, the scramjet combustor can be made operational and the combustion products from the RDC can be utilized to start the scramjet combustor. Since the scramjet combustor is not operational at lower Mach numbers, the likelihood of an unstart condition occurring in the scramjet combustor is reduced.

Referring now to the drawings, FIG. 1 is a schematic view of an exemplary combined cycle propulsion system according to an aspect of the present disclosure. In FIG. 1, a combined cycle propulsion system 2 is seen to include compressor-fed combustion engine 4, and a multi-mode supersonic engine 6. The compressor-fed combustion engine 4 may be any one of gas turbine engine or compressor-fed rotating detonation combustion (RDC) engine. As will be described below, the multi-mode supersonic engine 6 may include a combustion section 8 that has a first combustor portion 62 that may include, for example, an RDC combustor for ramjet-type operation, and a second combustor portion 66 that is a supersonic combustion type combustor 85, such as a scramjet combustor for scramjet-type operation. In the following description, the compressor-fed combustion engine 4 will be described as constituting a gas turbine engine that includes component parts of a gas turbine inlet section 12, a gas turbine compressor section 14, a gas turbine combustion section 16, a gas turbine turbine section 18, and a gas turbine exhaust nozzle section 20 that may include an afterburner 21. Each of the foregoing component parts of the compressor-fed combustion engine 4 will be described in more detail below. Generally, however, the component parts of the compressor-fed combustion engine 4 may be defined about a centerline axis 10 and the compressor-fed combustion engine 4 may extend longitudinally along the centerline axis 10.

Extending from a forward end 36 of the gas turbine compressor section 14 is a translatable spike 22. The translatable spike 22 can be translated longitudinally by a spike actuator 23 along the centerline axis 10 in an upstream direction 30 and in a downstream direction 32. When the translatable spike 22 is translated in the upstream direction 30, the translatable spike 22 is translated to a first (extended) position 24 so that a circumferential peak 34 of the translatable spike 22 disengages from an inner surface 28 of the gas turbine inlet section 12. A gap 38 is thus formed between the circumferential peak 34 of the translatable spike 22 and the inner surface 28 of the gas turbine inlet section 12 so as to allow an inlet airflow 40 to pass into the gas turbine inlet section 12 and to a compressor inlet 29 of the gas turbine compressor section 14. On the other hand, when the translatable spike 22 is translated in the downstream direction 32, the translatable spike 22 is translated to a second (retracted) position 26 so that the circumferential peak 34 of the translatable spike 22 engages with the inner surface 28 of the gas turbine inlet section 12 in order to restrict, or to stop the inlet airflow 40 from passing into the gas turbine inlet section 12. Of course, other techniques and structures, such as doors, slots, flaps, etc.) besides the translatable spike 22 can be implemented instead to control (i.e., permitting or restricting) the inlet airflow 40 allowed to enter into the gas turbine inlet section 12.

Referring still to FIG. 1, the compressor-fed combustion engine 4 may be surrounded or encased by an outer casing 42 that extends circumferentially about the centerline axis 10. The outer casing 42 may include a cooling flow passage 44 therewithin that extends from an upstream end 48 of the gas turbine inlet section 12 to a downstream end 50 of the gas turbine exhaust nozzle section 20. The cooling flow passage 44 allows a cooling airflow 46 to flow therethrough so as to provide cooling to an outer surface 140 of the multi-mode supersonic engine 6. The cooling flow passage 44 may also include a plurality of air bleed openings 52 that allow a portion of the cooling airflow 46 to pass from the cooling flow passage 44 into various component parts of the multi-mode supersonic engine 6. The air bleed openings 52 may also be arranged so as to allow some of the inlet airflow 40, compressed airflow 54 and/or combustion gases 56 to pass from the compressor-fed combustion engine 4 into the multi-mode supersonic engine 6.

In the FIG. 1 aspect, the multi-mode supersonic engine 6 is shown to include the first combustor portion 62 in a serial relationship with the second combustor portion 66, where the second combustor portion 66 is arranged downstream of the first combustor portion 62. Additionally, in the FIG. 1 aspect, the first combustor portion 62 and the second combustor portion 66 are depicted as being arranged so as to circumferentially surround the compressor-fed combustion engine 4. The multi-mode supersonic engine 6 includes an adjustable inlet section 58, which will be described in more detail below with regard to FIG. 3. Briefly, however, the adjustable inlet section 58 may be an adjustable converging inlet that compresses a supersonic inlet airflow 74 as it passes through the adjustable inlet section 58 to generate a compressed inlet airflow 76 that may generally include shockwaves. An isolator section 60 downstream of the adjustable inlet section 58 organizes the shockwaves to generate an isolator airflow 78, which may then, depending on the operational state of the multi-mode supersonic engine 6, be reduced to a subsonic airflow 78 (a) or may be a supersonic flow 78 (b). When the isolator airflow 78 is reduced to the subsonic airflow, the now subsonic isolator airflow 78 enters an inlet end 70 of the first combustor portion 62. A first portion 81 of the isolator airflow 78 enters an upstream end 72 of a combustor 79 of the first combustion portion 62, while a second portion 80 of the isolator airflow 78 enters a combustor bypass passage 84 as a bypass airflow 80 to bypass the combustor 79 of the first combustion portion 62. In a case where the isolator airflow 78 is the subsonic airflow 78 (a), the bypass airflow 80 may also be a subsonic airflow. On the other hand, in a case where the isolator airflow 78 is the supersonic airflow 78(b), the bypass airflow 80 may also be a supersonic airflow to the second combustor portion 66.

As the combustor 79, the first combustor portion 62 is seen to include a rotating detonation combustor (RDC) 82 into which the combustor inlet airflow 81 is provided and, as will be described in more detail below, a fuel 147 (FIG. 4) is injected into the RDC 82 by fuel injection ports 148 (FIG. 4) and detonated such that a rotating detonation combustion wave is generated. The combustor bypass passage 84 is arranged radially outward of the rotating detonation combustor 82 so as to allow the combustor bypass airflow 80 to flow therethrough to an inlet section 64 of the second combustor portion 66.

The inlet section 64 takes in the combustor bypass airflow 80 from the combustor bypass passage 84, along with combustion gases 86 from the rotating detonation combustor 82. The inlet section 64 may also function as an isolator. The inlet section 64 is in fluid communication with an outlet end 65 of the rotating detonation combustor 82 such that the combustor bypass airflow 80 and the combustion gases 86 flow downstream into the second combustor portion 66, where fuel is injected by fuel injectors 88 to generate a fuel-air mixture within the second combustor portion 66. The fuel-air mixture, in operation, may be ignited by utilizing the combustion gases 86 from the rotating detonation combustor 82, or depending on the fuel utilized by the second combustor portion 66, the fuel-air mixture may auto-ignite. Thus, the rotating detonation combustor 82 is configured to function as a pilot for the second combustor portion 66 to initiate ignition when transitioning between operations of the first combustor portion 62 and the second combustor portion 66 of the multi-mode supersonic engine 6. Once the second combustor portion 66 is successfully started, the rotating detonation combustor 82 may be shut down or may continue operating until a desired airspeed is reached. Utilizing the rotating detonation combustor 82 as a pilot may also reduce the magnitude and abruptness of a pressure drop when the second combustor portion 66 is ignited, thereby reducing the potential for an unstart condition. Thus, the second combustor portion 66 can be made operational at a higher Mach number in which an unstart condition is less likely to occur. Combustion product gases 90 are then expanded and exhausted through the adjustable exhaust nozzle section 68.

Figure 2:
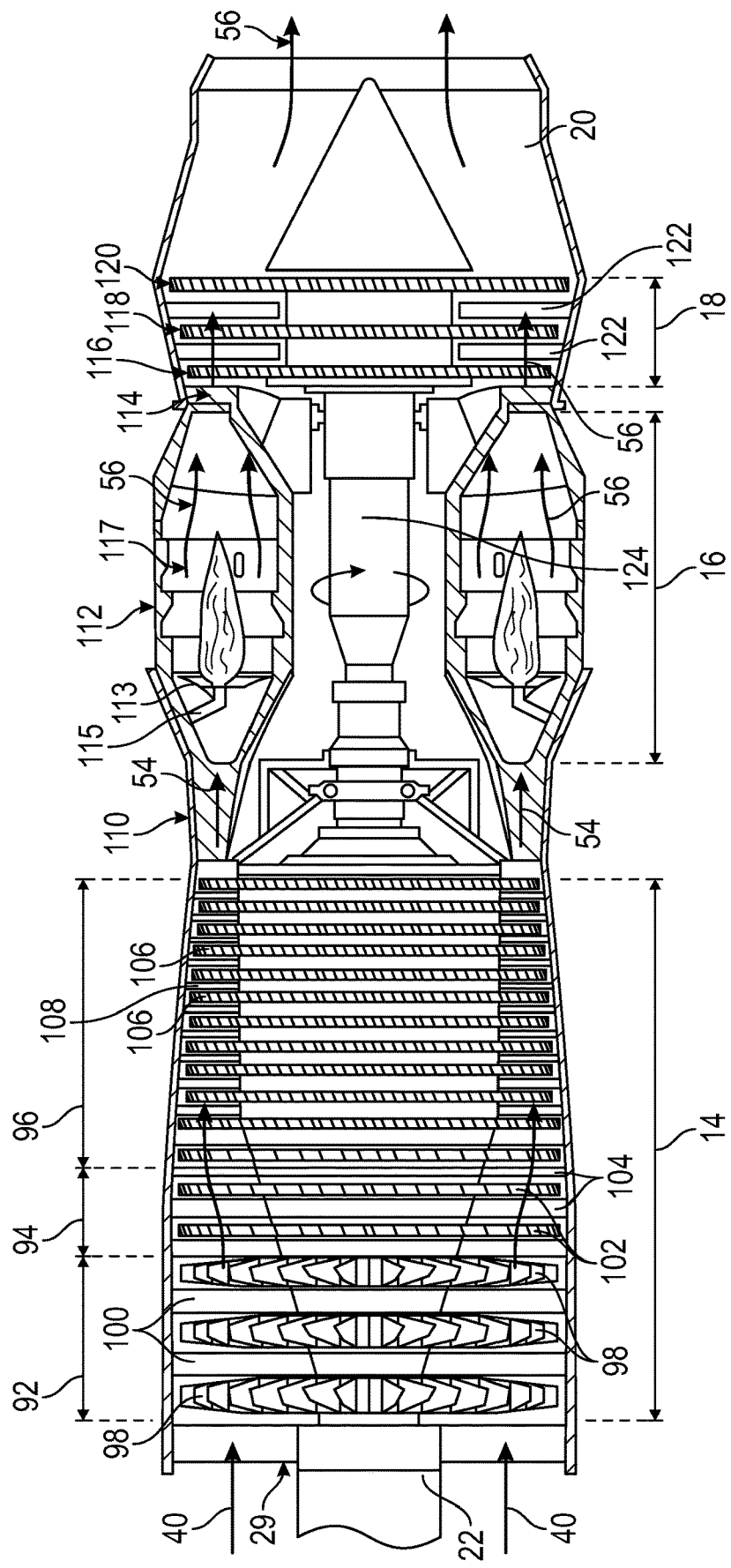
FIG. 2 is a cross-sectional side view of an exemplary turbojet engine, according to an aspect of the present disclosure.

FIG. 2 is a schematic partial cross-sectional side view of an exemplary gas turbine engine, according to an aspect of the present disclosure. As stated above, the compressor-fed combustion engine 4 may be a turbojet engine, or any similar engine that includes a mechanically driven compressor to compress air for use in combustion. FIG. 2 depicts an example of a turbojet engine as the compressor-fed combustion engine 4 that may be implemented in the combined cycle propulsion system 2 of the present disclosure. As seen in FIG. 2, the compressor-fed combustion engine 4 includes the gas turbine compressor section 14, the gas turbine combustion section 16, the gas turbine turbine section 18, and the gas turbine exhaust nozzle section 20. The gas turbine compressor section 14 may include a low pressure compressor section 92, an intermediate pressure compressor section 94, and a high pressure compressor section 96. The low pressure compressor section 92 includes a plurality of low pressure compressor rotors 98, and a plurality of low pressure compressor stators that include a plurality of low pressure compressor stator vanes 100 arranged circumferentially between each low pressure compressor rotor 98. Similarly, the intermediate pressure compressor section 94 includes a plurality of intermediate pressure compressor rotors 102 and a plurality of intermediate pressure compressor stators having a plurality of intermediate compressor stator vanes 104 arranged circumferentially between each intermediate pressure compressor rotor 102. Additionally, the high pressure compressor section 96 includes a plurality of high pressure compressor rotors 106 and a plurality of high pressure compressor stators having a plurality of high pressure compressor stator vanes 108 arranged circumferentially between each high pressure compressor rotor 106. The inlet airflow 40 enters the low pressure compressor section 92, where an initial compression takes place, and then enters the intermediate pressure compressor section 94 where the inlet airflow is further compressed before entering the high pressure compressor section 96 to further compress the inlet airflow 40 so as to obtain the compressed airflow 54. The compressed airflow 54 enters a diffusor 110 before entering the gas turbine combustion section 16.

Figure 9:
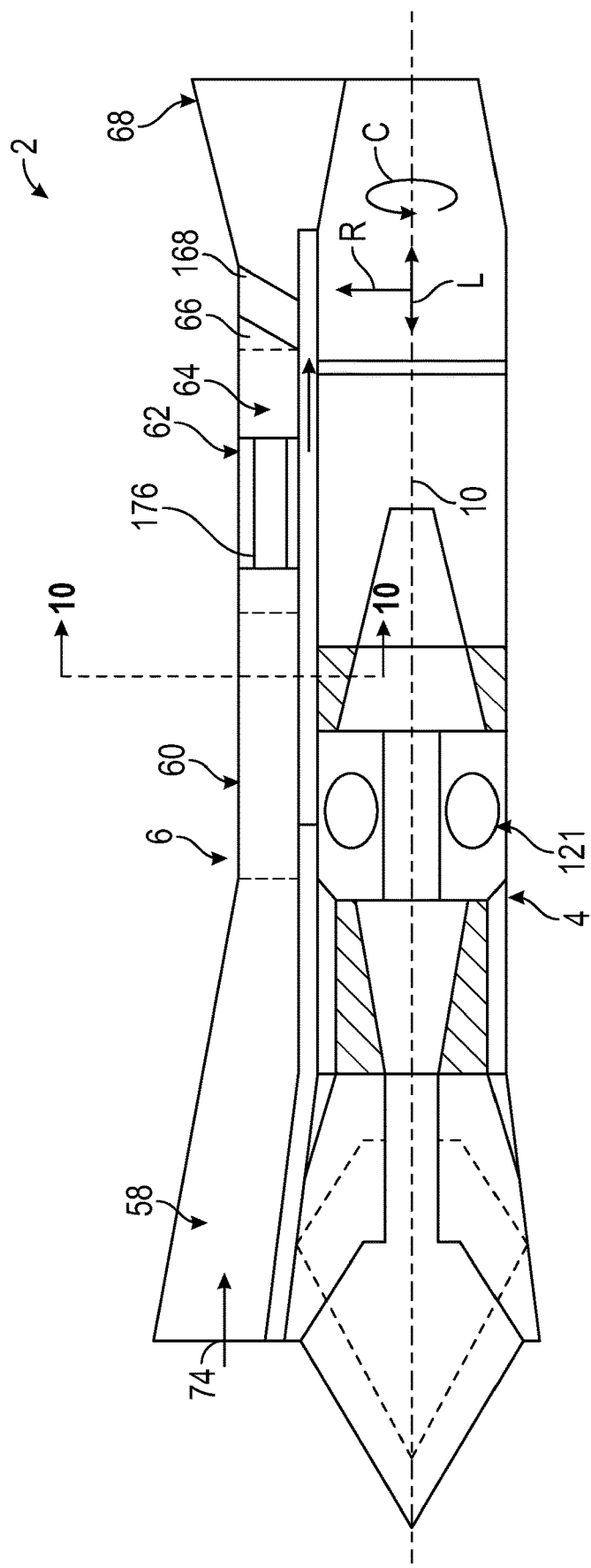
FIG. 9 is a schematic partial cross-sectional side view of a combined cycle propulsion system according to yet another aspect of the present disclosure.
Figure 13:
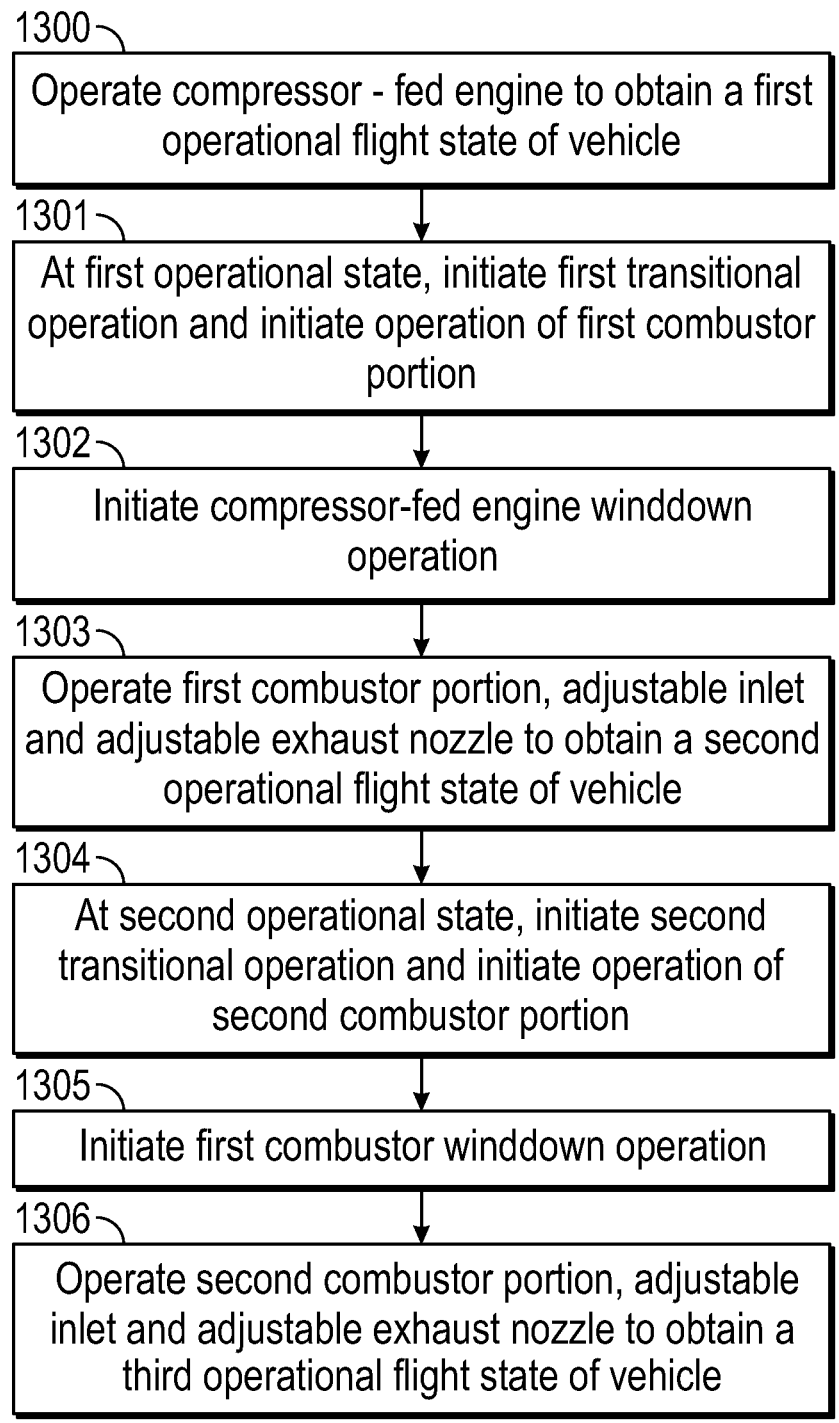
FIG. 13 is a flowchart of process steps for a method of operating a combined cycle propulsion system, according to an aspect of the present disclosure.

The gas turbine combustion section 16 includes a gas turbine combustor 112 that may be any type of combustor known to be implemented in gas turbine engines, including deflagration-type combustors or detonation-type combustors. For example, the gas turbine combustor 112 may be a deflagration-type combustor that may be a can-type combustor or an annular type deflagration combustor. Alternatively, the gas turbine combustion section 16 may include a rotating detonation combustor 121 (FIGS. 9 and 13). An annular type deflagration combustor as shown in FIG. 2 may include a plurality of swirl cups or fuel-air mixer assemblies 113 that are connected with a fuel nozzle 115 so as to inject a fuel-air mixture into a combustion chamber 117 that is ignited and burned to produce the combustion gases 56. The combustion gases 56 then flow from the gas turbine combustor 112 through a turbine nozzle, which may comprise a plurality of vanes 114 circumferentially arranged about the turbine nozzle. The combustion gases 56 then flow to the gas turbine turbine section 18. The gas turbine turbine section 18 may include a high pressure turbine 116, an intermediate pressure turbine 118, and a low pressure turbine 120. A plurality of turbine stator vanes 122 may be circumferentially arranged about the gas turbine turbine section 18 between the high pressure turbine 116 and the intermediate pressure turbine 118, and between the intermediate pressure turbine 118 and the low pressure turbine 120. The combustion gases 56 passing through the gas turbine turbine section 18 cause each of the high pressure turbine 116, the intermediate pressure turbine 118, and the low pressure turbine 120 to rotate.

A drive shaft assembly 124 connects the gas turbine turbine section 18 with the gas turbine compressor section 14. The drive shaft assembly 124 generally includes a plurality of concentrically arranged drive shafts (not shown) within the drive shaft assembly. The high pressure turbine 116 is driving connected via a high pressure drive shaft (not shown, but included within drive shaft assembly 124) to the high pressure compressor section 96 so as to drive each of the high pressure compressor rotors 106. Likewise, the intermediate pressure turbine 118 is drivingly connected via an intermediate pressure drive shaft (not shown, but included within drive shaft assembly 124) so as to drive each of the intermediate pressure compressor rotors 102. Additionally, the low pressure turbine 120 is drivingly connected via a low pressure drive shaft (not shown, but included within drive shaft assembly 124) so as drive shafts each of the low pressure compressor rotors 98.

In operation of a flight vehicle that includes the combined cycle propulsion system 2 having the compressor-fed combustion engine 4 described above, the compressor-fed combustion engine 4 is generally operable for all flight operations of the flight vehicle up to a certain flight airspeed of the compressor-fed combustion engine 4. For example, the flight vehicle having the compressor-fed combustion engine 4 may be capable of reaching an airspeed exceeding Mach 1, particularly when the translatable spike 22 can function as a converging-diverging nozzle to compress the inlet airflow 40 entering the gas turbine inlet section 12 such that the inlet airflow 40 entering the compressor inlet 29 is below Mach 1. As the vehicle approaches an operational air speed limit for the compressor-fed combustion engine 4, the multi-mode supersonic engine 6 may be engaged to become operable. Upon successful ignition of the multi-mode supersonic engine 6, the compressor-fed combustion engine 4 may be made non-operational by, for example, shutting down fuel flow to the compressor-fed combustion engine 4 and retracting the translatable spike 22 so as to restrict or to stop the inlet airflow 40 from entering the gas turbine inlet section 12 of the compressor-fed combustion engine 4. The combined cycle propulsion system 2 may then be operable with the multi-mode supersonic engine 6. As will be explained in more detail below, a first operation mode of the multi-mode supersonic engine 6 may be made operational where the first combustor portion 62 is engaged, and, then later, after approaching another airspeed limit of the first combustor portion 62, the second combustor portion 66 of the multi-mode supersonic engine 6 can be made operational and the first combustor portion 62 can be made non-operational by shutting off fuel to the first combustor portion 62.

Figure 3:
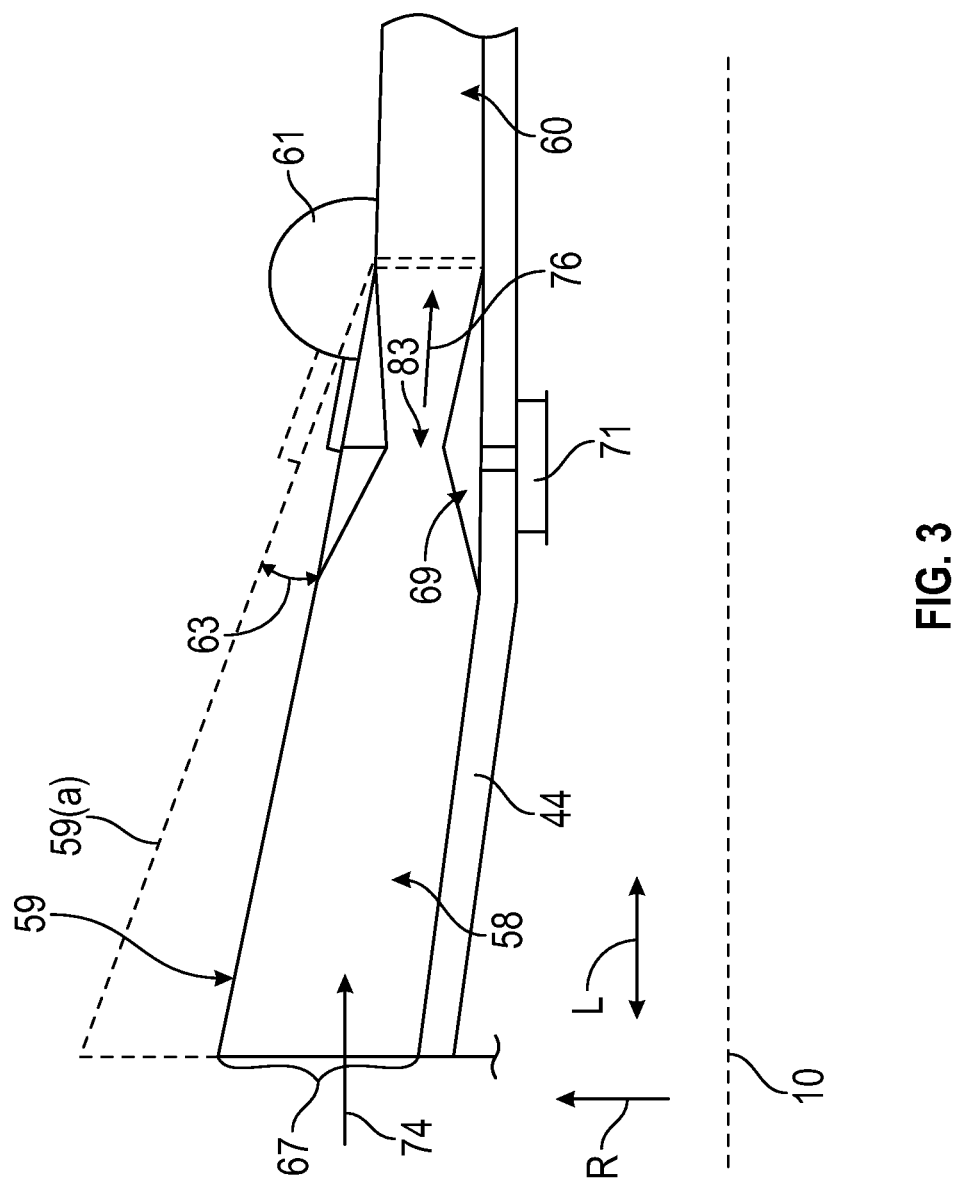
FIG. 3 is an enlarged view of an adjustable inlet section taken at detail view 125 of FIG. 1, according to an aspect of the present disclosure.

FIG. 3 is an enlarged view of the adjustable inlet section 58 taken at detail view 125 of FIG. 1, according to an aspect of the present disclosure. As seen in FIG. 3, the adjustable inlet section 58 may include an outer wall portion 59 that is connected to an actuator 61. The actuator 61 may adjust an angle 63 of the outer wall portion 59 to adjust a size of an inlet 67 of the adjustable inlet section 58. For example, the actuator 61 may adjust the angle 63 so that the outer wall portion 59 is translated to a position (shown as outer wall portion 59(*a*)) to increase a size of the inlet 67. In addition, or alternatively, the adjustable inlet section 58 may include a converging-diverging nozzle portion 69 that defines a throat 83 and that may be connected to the actuator 61 and/or to an actuator 71. The actuator 61 and/or the actuator 71 may operate to translate the converging-diverging nozzle portion 69 in a longitudinal direction (L), or may operate to adjust a height of the throat 83. As will be described below, the adjustable inlet section 58 is adjustable via actuator 61 and/or the actuator 71 to adjust the inlet airflow 74 of air to the multi-mode supersonic engine based on any one of various operating modes of the multi-mode supersonic engine 6.

Figure 4:
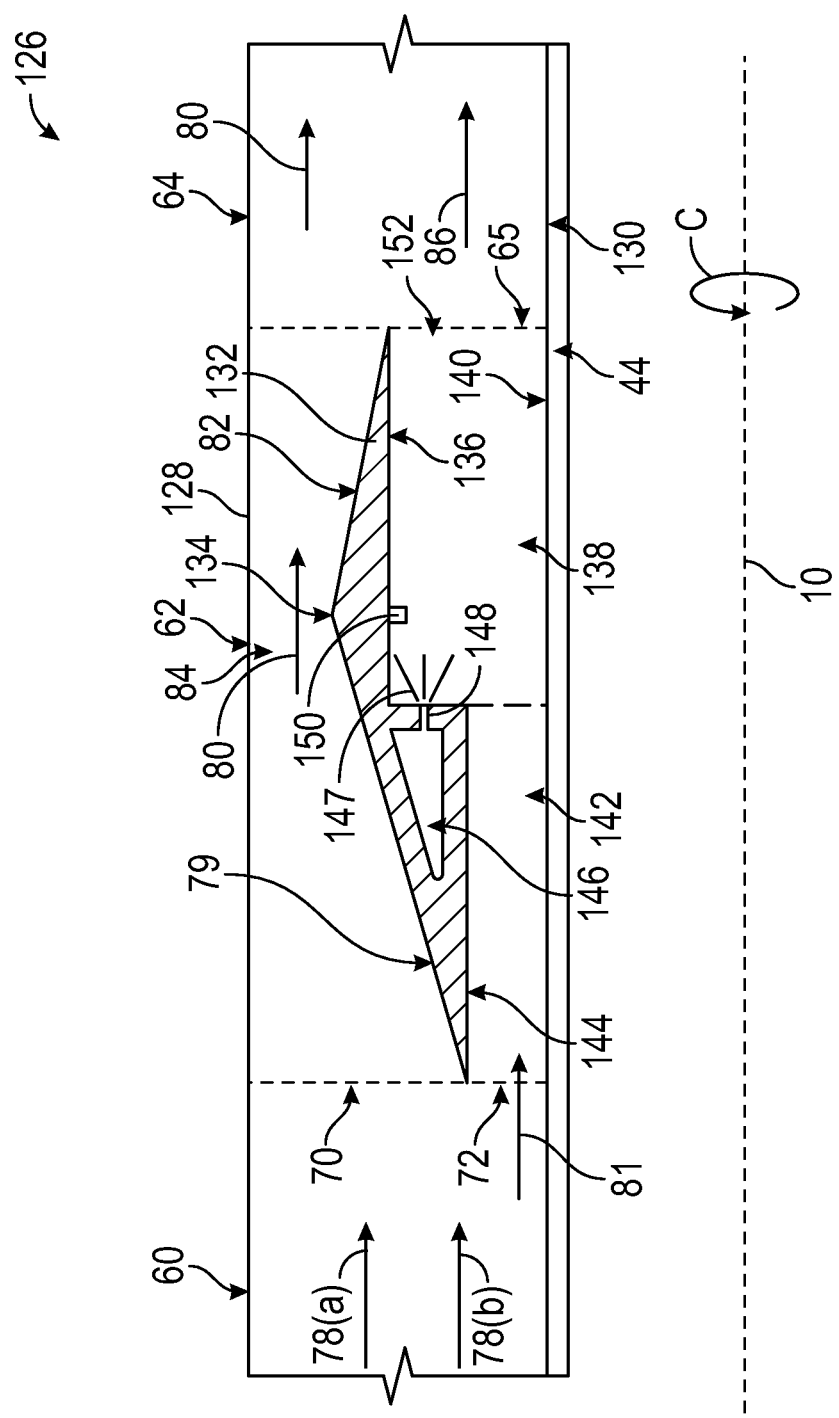
FIG. 4 is an enlarged view of a first combustor portion of a combustion section taken at detail view 126 in FIG. 1, according to an aspect of the present disclosure.

FIG. 4 is an enlarged view of the first combustor portion 62 taken at detail view 126 in FIG. 1, according to an aspect of the present disclosure. The first combustor portion 62 may generally be referred to as a ramjet combustor in that the first combustor portion 62 is generally operable with sub-sonic inlet airflow to the combustor, although the first combustor portion 62 may also be operable with a supersonic inlet airflow. Thus, the first combustor portion 62 may be referred to as a ramjet combustor. The first combustor portion 62 is defined between an outer wall 128 and an inner wall 130, where the inner wall 130 defines an outer wall of the cooling flow passage 44. In the FIG. 3 aspect, both the outer wall 128 and the inner wall 130 extend circumferentially about the centerline axis 10. The first combustor portion 62 includes the rotating detonation combustor 82. The rotating detonation combustor 82 includes a housing 132 that may define a generally triangular shape along the longitudinal direction, and that extends circumferentially about the centerline axis 10. Of course, the shape of the housing 132 may be other shapes and the shape may be based on shock waves that may be reflected and/or induced in the bypass airflow 80 passing through the combustor bypass passage 84. The triangular shape of the housing 132 may form, at least in part with the outer wall 128, a converging-diverging nozzle 134 within the combustor bypass passage 84, through which the bypass airflow 80 passes. The housing 132 includes a downstream inner surface 136 that forms an outer wall of a detonation chamber 138, while an outer surface 140 of the inner wall 130 defines an inner wall of the detonation chamber 138. The detonation chamber 138 extends circumferentially about the centerline axis 10.

An inlet 142 to the detonation chamber 138 is defined by an upstream inner surface 144 of the housing 132 and the outer surface 140 of the inner wall 130. The combustor inlet airflow 81 passes from the isolator section 60 through the upstream end 72 of the combustor 79 into the inlet 142 and then into the detonation chamber 138. The housing 132 is also seen to include a fuel manifold 146 that supplies a fuel 147 to a plurality of fuel injection ports 148 that are circumferentially spaced about the centerline axis 10. One or more ignitors 150 extend from the housing 132 into the detonation chamber 138, where the ignitors 150 may be circumferentially spaced about the centerline axis 10. In operation, the combustor inlet airflow 81 from the isolator section 60 passes through the inlet 142 into the detonation chamber 138. The fuel 147 is injected into the detonation chamber 138 via the plurality of fuel injection ports 148 to generate a fuel-air mixture within the detonation chamber 138, and the fuel-air mixture is detonated by the ignitors 150 so as to generate a rotating detonation wave within the detonation chamber 138. The rotating detonation wave travels circumferentially around the detonation chamber 138 and expands lengthwise through an outlet 152 of the detonation chamber 138 to expel the combustion gases 86. When the first combustor portion 62 is operated without the second combustor portion 66 being operated, the combustion gases 86 of the detonation wave exiting the outlet 152, and the bypass airflow 80, travel through an inlet section 64 of the second combustor portion 66 and then, as shown in FIG. 1, through the second combustor portion 66 and the adjustable exhaust nozzle section 68 to provide propulsion. When the multi-mode supersonic engine 6 is operated without the second combustor portion 66 being operated, the second combustor portion 66 is idle and merely acts as a passive flow channel leading to the adjustable exhaust nozzle section 68.

Figures 5, 6, 7:
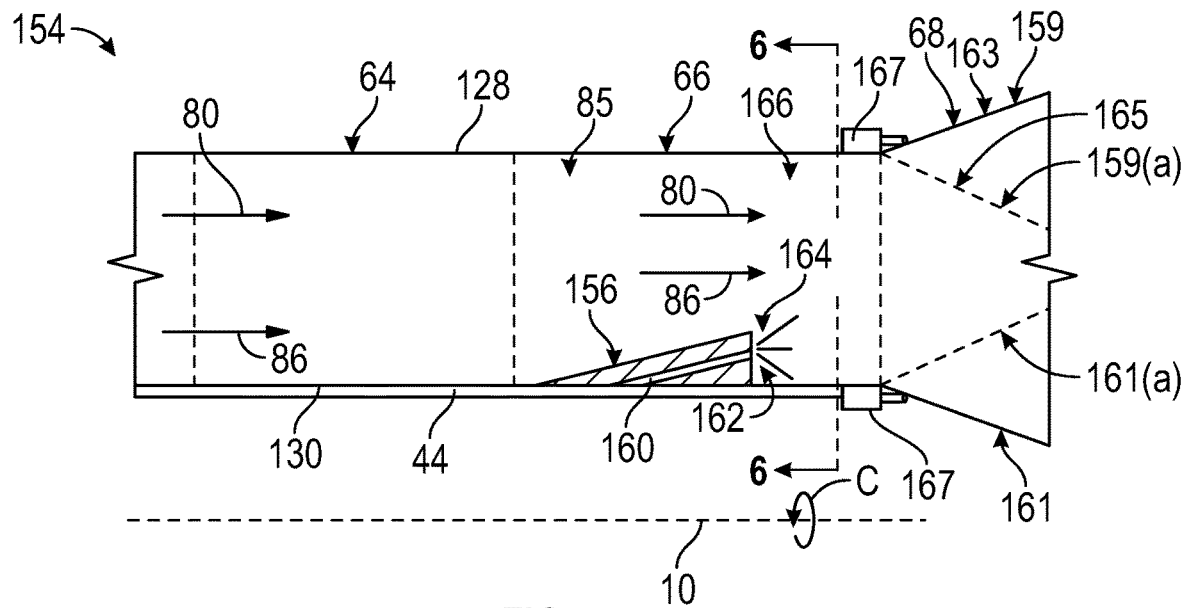
FIG. 5 is an enlarged view of a second combustor portion of a combustion section and an adjustable exhaust nozzle section, taken at detail view 154 in FIG. 1, according to an aspect of the present disclosure.
FIG. 6 is schematic cross-sectional view taken at plane 6-6 of FIG. 5, according to an aspect of the present disclosure.
FIG. 7 is an enlarged view of an alternate second combustor portion, according to another aspect of the present disclosure.

FIG. 5 is an enlarged view of the second combustor portion 66 and the adjustable exhaust nozzle section 68, taken at detail view 154 in FIG. 1, according to an aspect of the present disclosure. The second combustor portion 66 may be a supersonic combustion combustor, also referred to as a scramjet combustor. The second combustor portion 66 is defined between the outer wall 128 and the inner wall 130, where the inner wall 130 defines an outer wall of the cooling flow passage 44. In FIG. 5, both the outer wall 128 and the inner wall 130 extend circumferentially about the centerline axis 10 and define a combustion chamber 166 therebetween. The second combustor portion 66 is also seen to include a plurality of circumferentially spaced ramped fuel injectors 156. Referring briefly to FIG. 6, which is schematic cross-sectional view taken at plane 6-6 of FIG. 5, the plurality of ramped fuel injectors 156 are seen to be circumferentially spaced apart from one another with a gap 158 between the ramped fuel injectors 156. Referring back to FIG. 5, each ramped fuel injector 156 is seen to include a fuel injector fuel passage 160, which may be connected to a fuel manifold (not shown), and a fuel injection port 162. When the second combustor portion 66 is operational, a fuel 164 is injected from the fuel injection port 162 into the combustion chamber 166. The fuel 164 is mixed with the bypass airflow 80 and the combustion gases 86 from the rotating detonation combustor 82 of the first combustor portion 62. The combustion gases 86 from the rotating detonation combustor 82 of the first combustor portion 62 may function as a pilot (i.e., as an ignition source) for the second combustor portion 66. Thus, the second combustor portion 66 is operable in conjunction with the first combustor portion 62 and, more particularly, with the rotating detonation combustor 82 functioning as the pilot so as to reduce the potential for an unstart condition in the second combustor portion 66.

FIG. 5 also depicts the adjustable exhaust nozzle section 68. The adjustable exhaust nozzle section 68 is seen to include an exhaust nozzle outer portion 159 and an exhaust nozzle inner portion 161, each of which are connected to an exhaust nozzle actuator 167. The exhaust nozzle actuators 167 may actuate the exhaust nozzle outer portion 159 and the exhaust nozzle inner portion 161 so as to define a diverging exhaust nozzle 163, or a converging exhaust nozzle 165 (shown with exhaust nozzle outer portion 159(*a*) and exhaust nozzle inner portion 161(*a*)). Thus, in an operational state in which the first combustor portion 62 is operated and the second combustor portion 66 is not operated, such that the multi-mode supersonic engine 6 is operating in a ramjet mode, the adjustable exhaust nozzle section 68 may form the converging exhaust nozzle 165. On the other hand, in an operational state in which the second combustor portion 66 is operated, the adjustable exhaust nozzle section 68 by be actuated to form the diverging exhaust nozzle 163. Of course, in transitioning from the first combustor portion 62 being operational as a pilot for the second combustor portion 66, the adjustable exhaust nozzle section 68 transitions between the converging exhaust nozzle 165 and the diverging exhaust nozzle 163. For example, after ignition of the second combustor portion 66 using the rotating detonation combustor 82 as the pilot, the operation of the rotating detonation combustor 82 of the first combustor portion 62 may be terminated and only the second combustor portion 66 is operated, and the adjustable exhaust nozzle section 68 is actuated accordingly during the transition.

FIG. 7 is an enlarged view of an alternate second combustor portion 66, according to another aspect of the present disclosure. In the FIG. 7 aspect, a plurality of fuel injector vanes 168 are implemented instead of the ramped fuel injectors 156. The plurality of fuel injector vanes 168 may be circumferentially spaced apart from one another, in the same manner as the ramped fuel injectors 156 shown in FIG. 6. Each of the fuel injector vanes 168 may extend between the inner wall 130 and the outer wall 128, and may be aligned at an angle 174. In addition, each of the fuel injector vanes 168 includes a vane fuel injector fuel passage 170 that provides a flow of the fuel 164 from a fuel manifold (not shown) to a fuel injector port 172 on a downstream side of the fuel injector vane 168. Each of the fuel injector vanes 168 functions similar to the ramped fuel injectors 156 to provide fuel for supersonic combustion.

Figure 8:
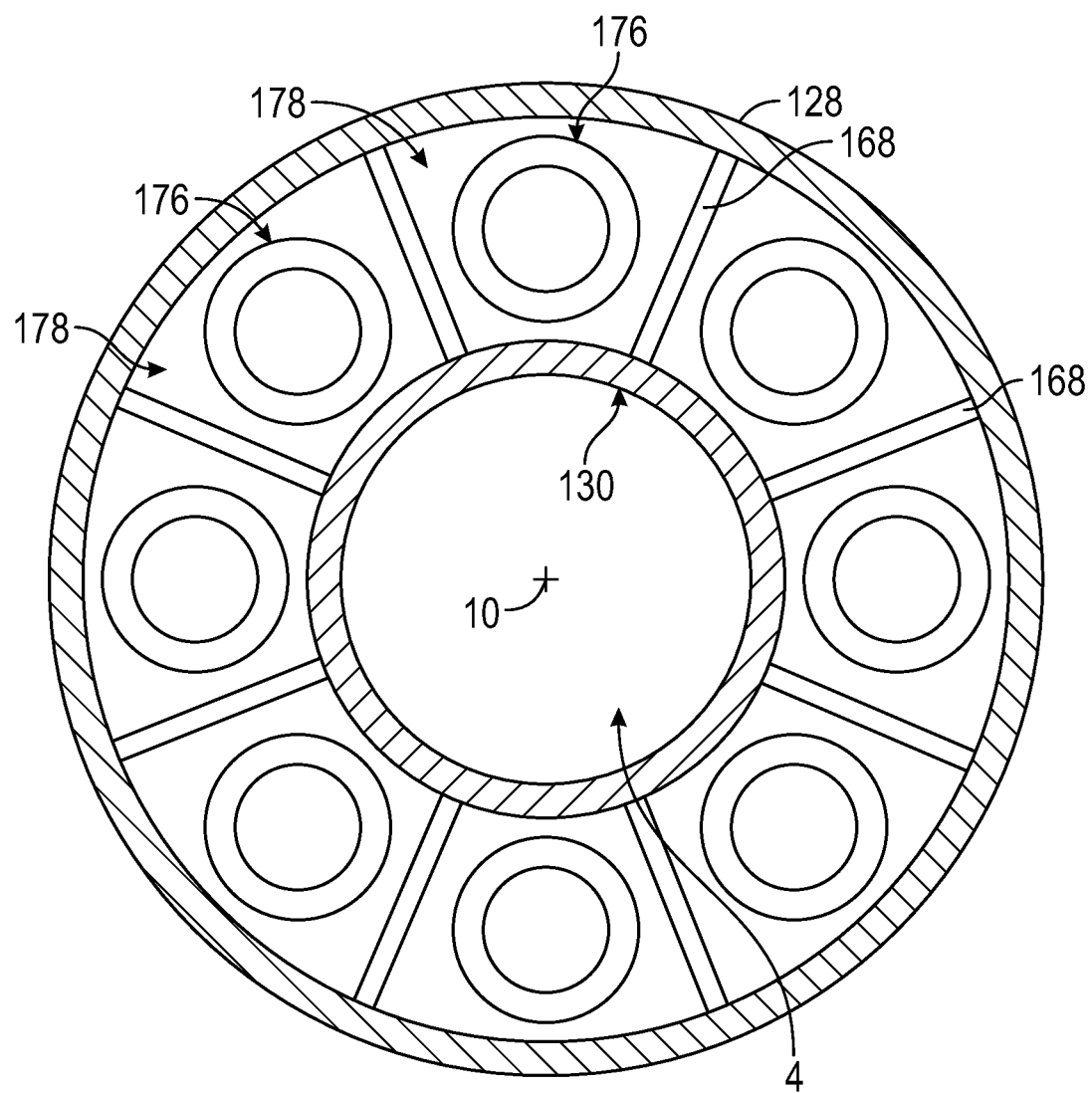
FIG. 8 is a schematic cross-sectional view taken at plane 8-8 of FIG. 1 of a combined cycle propulsion system according to another aspect of the present disclosure.

FIG. 8 is a schematic cross-sectional view taken at plane 8-8 of FIG. 1 of a combined cycle propulsion system according to another aspect of the present disclosure. In the aspects of FIGS. 1 to 7, the first combustor portion 62 of the multi-mode supersonic engine 6 was described with a single rotating detonation combustor 82 extending circumferentially about the centerline axis 10. In an alternate aspect of FIG. 8, the first combustor portion 62 includes a plurality of rotating detonation combustors 176. Each of the plurality of rotating detonation combustors 176 may be similar to the rotating detonation combustor 82, but on a smaller (individual) scale. The plurality of rotating detonation combustors 176 are circumferentially spaced apart from one another about the centerline axis 10. A plurality of combustor bypass flow passages 178 (i.e., a gap) are provided between respective ones of the rotating detonation combustors 176. Each combustor bypass flow passage 178 may function similar to the combustor bypass passage 84 of the FIG. 4 aspect to provide for the bypass airflow 80 to bypass the rotating detonation combustors 176 and to flow to the inlet section 64 (see FIG. 1) of the second combustor portion 66. The FIG. 8 aspect also depicts the fuel injector vanes 168 as shown in FIG. 7 being arranged circumferentially about the centerline axis 10. The fuel injector vanes 168 are shown to be circumferentially aligned with the respective bypass flow passages 178. Each of the fuel injector vanes 168 may be arranged in the second combustor portion 66 downstream of the rotating detonation combustors 176, or, as will be described in more detail below, may be arranged within the combustor bypass flow passage 178 circumferentially adjacent to the rotating detonation combustors 176.

Figure 10:
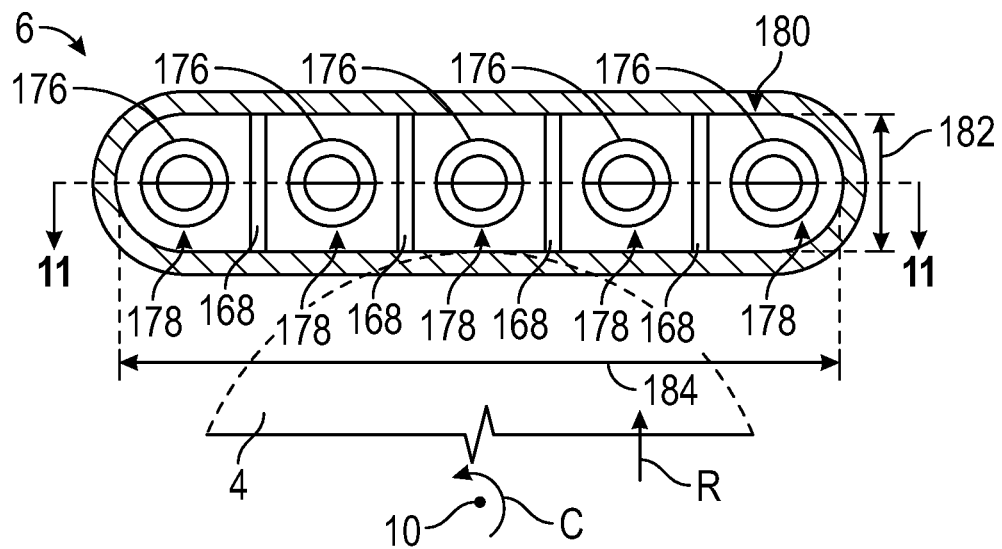
FIG. 10 is a partial cross-sectional aft-looking view, taken at plane 10-10 of FIG. 9, according to yet another aspect of the present disclosure.

Referring to FIGS. 9 and 10, FIG. 9 is a schematic partial cross-sectional side view of a combined cycle propulsion system according to yet another aspect of the present disclosure, and FIG. 10 is a partial cross-sectional view taken at plane 10-10 of FIG. 9. In each of the foregoing aspects of FIGS. 1 to 8, the multi-mode supersonic engine 6 is depicted as extending circumferentially about the centerline axis 10. In the aspect of FIGS. 9 and 10, however, the multi-mode supersonic engine 6 is arranged radially outward on one side of the compressor-fed combustion engine 4. In this aspect, the compressor-fed combustion engine 4 defines a longitudinal direction (L) along a centerline axis 10 of the compressor-fed combustion engine 4, a circumferential direction (C) about the centerline axis 10, and a radial direction (R) extending from the centerline axis 10, and the multi-mode supersonic engine 6 extends along a length of the compressor-fed combustion engine 4. However, the multi-mode supersonic engine 6 may be shorter or longer than the length of the compressor-fed combustion engine 4.

As seen in FIG. 10, the multi-mode supersonic engine 6 may define a stadium shape profile 180, where a height 182 of the stadium shape profile 180 extends in the radial direction (R) and a length 184 of the stadium shape profile 180 extends orthogonal to both the longitudinal direction (L) and the radial direction (R). The multi-mode supersonic engine 6 includes the first combustor portion 62 (FIG. 9) having a plurality of the rotating detonation combustors 176 that are spaced apart from one another along the length 184 of the stadium shape profile 180. Similar to the FIG. 8 aspect, a plurality of combustor bypass flow passages 178 are arranged between respective ones of the plurality of rotating detonation combustors 176. Also similar to the FIG. 8 aspect, a plurality of the fuel injector vanes 168 are seen to be aligned with respective ones of the combustor bypass flow passages 178, and as shown in FIG. 9, the fuel injector vanes 168 may be arranged downstream of the rotating detonation combustors 176. The multi-mode supersonic engine 6 of FIGS. 9 and 10 may be operationally similar to the FIGS. 1 to 8 aspects with respect to the operation of the adjustable inlet section 58, the first combustor portion 62, the second combustor portion 66, and the adjustable exhaust nozzle section 68. Thus, the plurality of rotating detonation combustors 176 of the first combustor portion 62 may function as a pilot for the second combustor portion 66.

Figure 11:
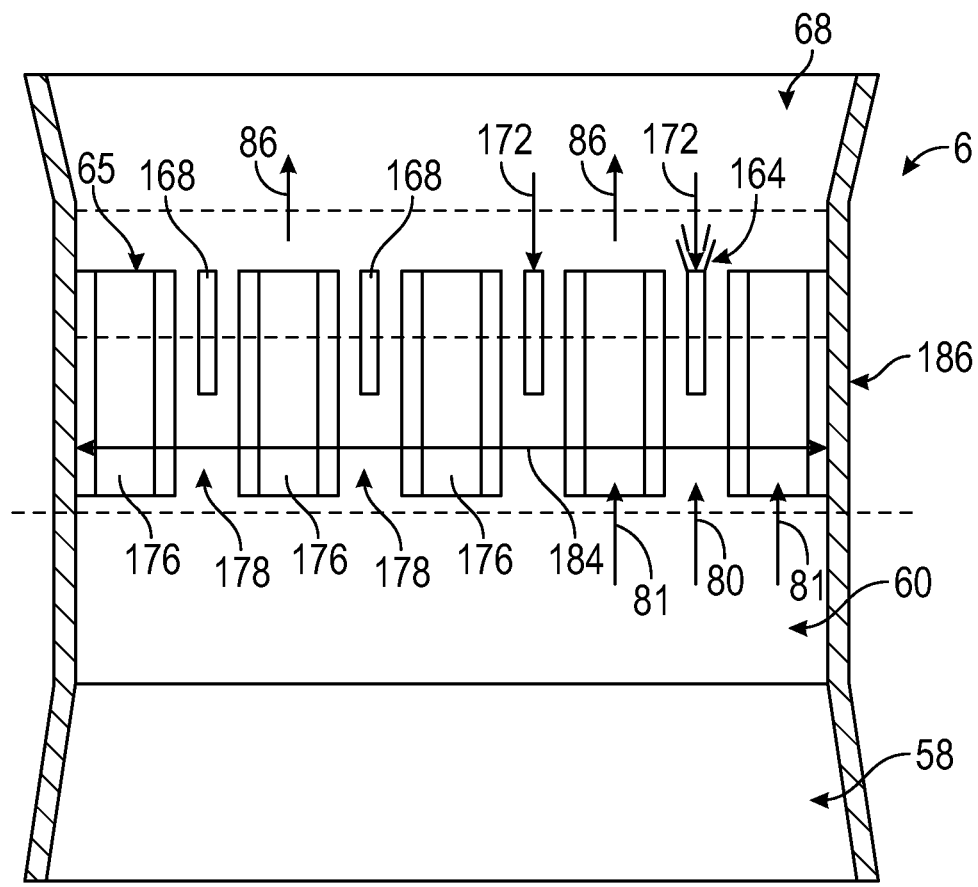
FIG. 11 is a cross-sectional top view taken at plane 11-11 in FIG. 10, depicting a multi-mode supersonic engine, according to another aspect of the present disclosure.

FIG. 11 is a cross-sectional top view taken at plane 11-11 in FIG. 10, depicting a multi-mode supersonic engine 6, according to another aspect of the present disclosure. The FIG. 11 aspect is similar to the FIG. 9 and FIG. 10 aspect in that the FIG. 11 aspect includes the stadium shape profile 180 as depicted in FIG. 10, and, in the same manner as described with regard to the FIG. 10 aspect, a plurality of rotating detonation combustors 176 are spaced apart along the length 184 and a plurality of combustor bypass flow passages 178 are included between respective ones of the plurality of rotating detonation combustors 176. In the same manner as depicted in FIG. 10, the plurality of rotating detonation combustors 176 share a common adjustable inlet section 58 and a common isolator section 60 downstream of the adjustable inlet section 58. However, unlike the FIG. 9 aspect that includes the first combustor portion 62 upstream of the second combustor portion 66, in FIG. 11, the first combustor portion 62 and the second combustor portion 66 are arranged in a shared combustion section 186. Thus, the shared combustion section 186 includes each of the plurality of rotating detonation combustors 176, the plurality of combustor bypass flow passages 178 between each of the plurality of rotating detonation combustors 176, and the fuel injector vanes 168 arranged within respective ones of the plurality of combustor bypass flow passages 178. With the aspect of FIG. 11, when the first combustor portion 62 is operated without the second combustor portion 66 being operated, the rotating detonation combustors 176 are operational to receive the combustor inlet airflow 81 and the bypass airflow 80 passes through the combustor bypass flow passages 178. The combustion gases 86 from the rotating detonation combustors 176 mix with the bypass airflow 80 to exit the adjustable exhaust nozzle section 68. When the second combustor portion 66 is started to be operational, the rotating detonation combustors 176 function as a pilot for the second combustor portion 66 such that the combustion gases 86 from the rotating detonation combustors 176 ignite the fuel 164 injected from the fuel injector ports 172 of the fuel injector vanes 168. Thus, operationally, the multi-mode supersonic engine 6 of the FIG. 11 aspect is similar to the operation of the FIG. 10 aspect.

Figure 12:
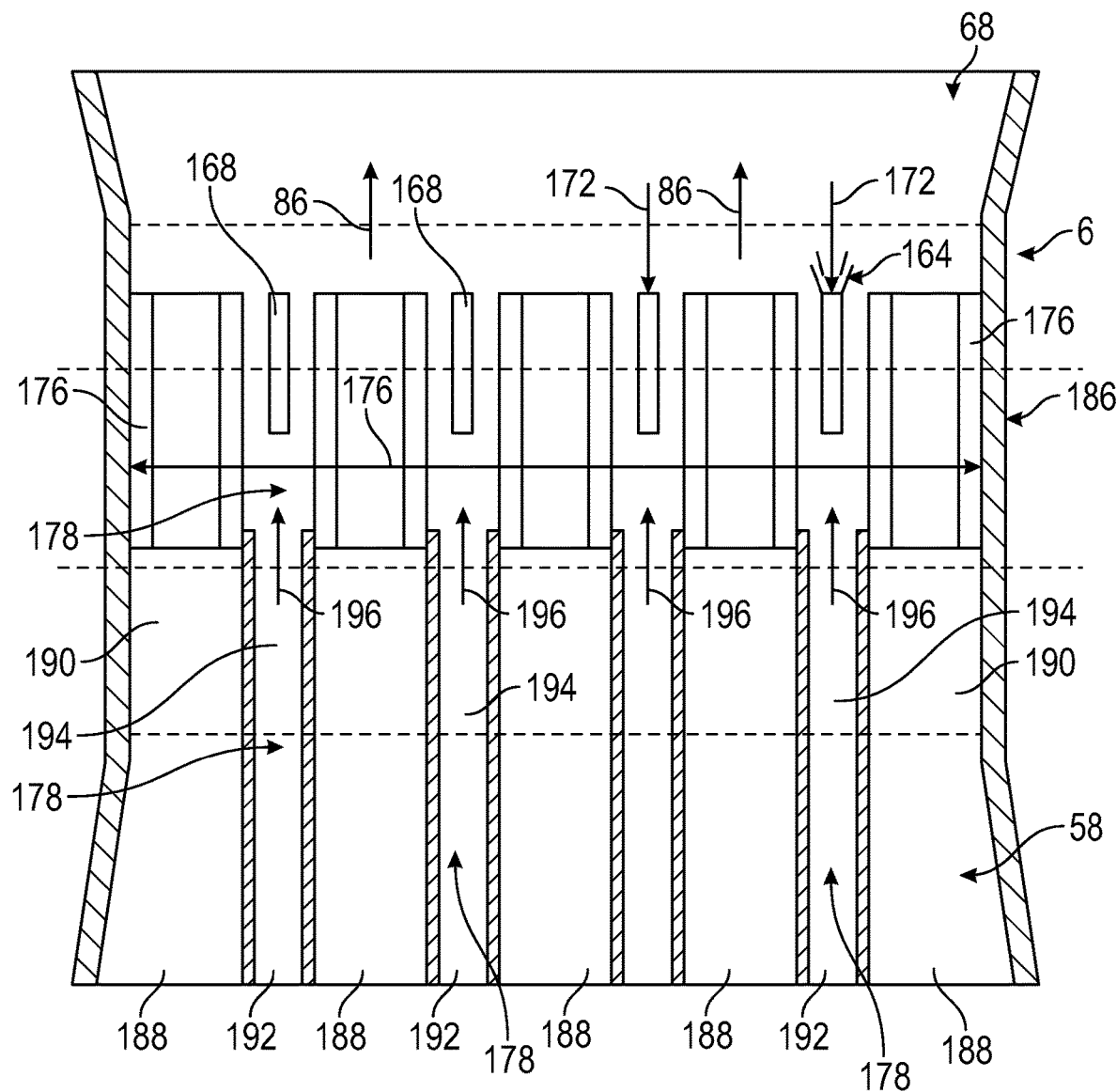
FIG. 12 depicts another arrangement of the FIG. 11 aspect of the present disclosure.

FIG. 12 depicts another arrangement of the FIG. 11 aspect of the present disclosure. In the FIG. 11 arrangement, each of the plurality of rotating detonation combustors 176 receive the isolator airflow 78 from a common (single) adjustable inlet section 58 and a common (single) isolator section 60. Likewise, each of the plurality of combustor bypass flow passages 178 in FIG. 11 receive the isolator airflow 78 from the common (single) adjustable inlet section 58 and the common (single) isolator section 60. In the FIG. 12 arrangement, however, the multi-mode supersonic engine 6 includes a plurality of first combustor portion inlet sections 188 and a plurality of corresponding isolator sections 190. Each inlet section 188 of the plurality of inlet sections 188 and each isolator section 190 of the plurality of isolator sections 190 correspond to a respective one of the rotating detonation combustors 176. In addition, each of the combustor bypass flow passages 178 includes a respective bypass inlet section 192 and an isolator section 194 so as to provide an airflow 196 to the second combustor portion 66 containing the fuel injector vanes 168 of the shared combustion section 186.

Each of the foregoing engine types may utilize a different type of fuel. For example, when the compressor-fed combustion engine 4 is a gas turbine engine, any one of a variety of kerosene-based fuels, such as Jet A, Jet A-1, Jet B, JP 4, JP8, etc., may be utilized. On the other hand, when the compressor-fed combustion engine includes a rotating detonation combustor instead of a deflagration-type combustor, various other fuel types such as propane, ethane, ethylene, and hydrogen may be utilized in conjunction with air or oxygen as a fuel-air mixture. Similarly, the first combustor portion 62 may also utilize any of the foregoing fuel types, while the second combustor portion 66 may utilize hydrogen as a fuel. Thus, the compressor-fed combustion engine 4 may utilize a first fuel type from among the foregoing, while the first combustor portion 62 may utilize a second fuel-type different from the first fuel-type, and the second combustor portion 66 may utilize a third fuel-type different from the first fuel-type and different from the second fuel-type.

Figure 14:
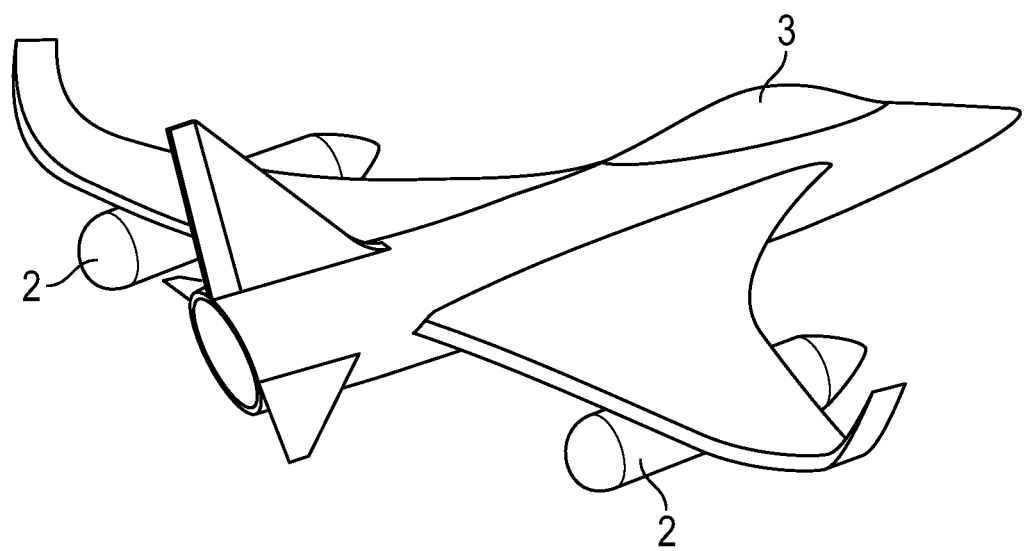
FIG. 14 depicts an example of a flight vehicle in which the combined cycle propulsion system may be implemented, according to an aspect of the present disclosure.

FIG. 13 is a flowchart of process steps for a method of operating a combined cycle propulsion system, according to an aspect of the present disclosure. FIG. 14 depicts an example of a flight vehicle 3, which may be a hypersonic flight vehicle, in which the combined cycle propulsion system 2 may be implemented. The method of operating the combined cycle propulsion system 2 may be implemented in the flight vehicle 3 in which the combine cycle propulsion system 2 is provided, where the combined cycle propulsion system 2 may correspond to any of the foregoing aspects in FIGS. 1 to 12. In a first step 1300, the compressor-fed combustion engine 4 is operated to obtain a first operational flight state of the flight vehicle. The first operational flight state may correspond to a particular air speed of the flight vehicle 3, and for operation of the compressor-fed combustion engine 4, may correspond to a flight airspeed of between about Mach 0.9 to about Mach 2. For airspeeds that exceed Mach 1, to maintain operation of the compressor-fed combustion engine 4, the translatable spike 22 (FIG. 1) may be translated to control the inlet airflow 40 passing through the gas turbine inlet section 12 so that the inlet airflow 40 at the compressor inlet 29 is a subsonic airflow. During operation of the compressor-fed combustion engine 4 in step 1300, the multi-mode supersonic engine 6 may passively allow the inlet airflow 74 to merely pass through the multi-mode supersonic engine 6. Alternatively, the adjustable inlet section 58 may be actuated to close or restrict the inlet airflow 74 from passing through the multi-mode supersonic engine 6.

In step 1301, once the first operational flight state of the flight vehicle 3 has been reached, or as the first operational flight state is being approached, a first transitional operation is initiated to initiate a first supersonic operation mode of the multi-mode supersonic engine 6. The first transitional operation may comprise actuating the adjustable inlet section 58 (FIG. 3) so as to compress the inlet airflow 74 to generate the compressed inlet airflow 76, and to organize the shockwaves from the compressed inlet airflow 76 via the isolator section 60 to obtain a subsonic inlet flow of the inlet air 81 (FIGS. 1 and 4) to the first combustor portion 62. In the aspect of FIG. 1, the first combustor portion 62 includes the at least one rotating detonation combustor 82 to which the combustor inlet airflow 81 passes, and the combustor bypass passage 84 to which the bypass airflow 80 passes. In the first transitional operation of step 1301, operation of the first combustor portion (i.e., the at least one rotating detonation combustor 82) is initiated by, a shown in FIG. 4, injecting the fuel 147 from the fuel injection ports 148 to the detonation chamber 138, and igniting the fuel and air mixture via the ignitors 150. As was discussed above with regard to FIG. 4, a detonation wave is thus generated and combustion gases 86, along with the bypass airflow 80, flow downstream to the second combustor portion 66. The second combustor portion 66 is not operated at this stage and the combustion gases 86 and the bypass airflow 80 flow through the adjustable exhaust nozzle section 68. The adjustable exhaust nozzle section 68, at this stage of operation of the multi-mode supersonic engine 6 may define the converging exhaust nozzle 165 (FIG. 5) to provide thrust. At the transitional operation, the multi-mode supersonic engine 6 is generally operating as a ramjet engine.

In step 1302, once the first combustor portion 62 has been successfully started, a winddown operation may be initiated for the compressor-fed combustion engine 4. The winddown operation may include terminating operation of the gas turbine combustor 112 and the compressor sections 92, 94 and 96. In addition, the translatable spike 22 may be actuated to the second retracted position 26 so as to close off or restrict the inlet airflow 40 entering the gas turbine inlet section 12 of the compressor-fed combustion engine 4.

In step 1303, the first supersonic operational mode is obtained in which the first combustor portion 62, the adjustable inlet section 58, and the adjustable exhaust nozzle section 68 are operated to obtain a second operational state of the flight vehicle 3. For example, as the airspeed of the vehicle increases due to operation of the first combustor portion 62, the adjustable inlet section 58 may be adjusted based on the inlet airflow 74 and the adjustable exhaust nozzle section 68 may also be adjusted to increase the airspeed of the flight vehicle 3. The second operational state may be, for example, an airspeed of the flight vehicle 3 of about Mach 3 to about Mach 4. In this flight vehicle airspeed range, the combustor inlet airflow 81 and the bypass airflow 80 may begin to become supersonic within the first combustor portion 62 and may reach, for example, an inlet airflow speed within the first combustor portion 62 of greater than Mach 1 and up to about Mach 2. The rotating detonation combustor 82 is operable with the supersonic inlet airflow, but as the combustor inlet airflow 81 approaches, for example, Mach 2, operation of the rotating detonation combustor 82 may become less efficient and may approach an operational limit.

In step 1304, at the second operational flight state, or as the flight vehicle 3 approaches the second operational flight state approaches, a second transitional supersonic operation mode is initiated to initiate a second supersonic operation mode of the multi-mode supersonic engine 6. The second transitional supersonic operation mode may include actuating the adjustable inlet section 58 for a scramjet operation, and thus, the adjustable inlet section 58 may be further adjusted to obtain a supersonic inlet flow of the compressed inlet airflow 76 and the bypass airflow 80 to the second combustor portion 66. In addition, the adjustable exhaust nozzle section 68 may be adjusted to transition from the converging exhaust nozzle 165 to the diverging exhaust nozzle 163 (FIG. 5), and operation of the second combustor portion 66 is initiated. In initiating operation of the second combustor portion 66, which, as described above, may comprise a scramjet combustor that includes either the ramped fuel injectors 156 (FIG. 5), or the fuel injector vanes 168 (FIG. 7), the fuel 164 is injected into the second combustor portion 66. In order to reduce the possibility of an unstart condition in the second combustor portion 66, the combustion gases 86 from the rotating detonation combustor 82 of the first combustor portion 62 is utilized as a pilot to start the ignition of the second combustor portion 66. Thus, during the second transitional supersonic operation mode, both the first combustor portion 62 and the second combustor portion 66 are made operational.

Once the secondary combustor portion 66 has successfully started, in step 1305, a first combustor portion winddown operation is initiated to winddown operation of the first combustor portion 62. In other words, the supply of the fuel 147 to the rotating detonation combustor 82 may be terminated so as to end operation of the rotating detonation combustor 82. In step 1306, the second combustor portion 66 is operated as a scramjet combustor, and the adjustable inlet section and the adjustable exhaust nozzle section are operated to function as a scramjet to obtain a third operational flight state of the flight vehicle. The third operational flight state may be, for example, an airspeed of the flight vehicle of, for example, Mach 5 or greater than Mach 5. In the scramjet operation, an inlet airflow speed of the inlet airflow 76 and the bypass airflow 80 to the second combustor portion 66 may be, for example, about Mach 3, but in any event, greater than Mach 1. Thus, the combined cycle propulsion system 2 can provide for transitional flight modes from subsonic flight, to supersonic flight, to hypersonic flight.

While the foregoing description relates generally to a gas turbine engine, it can readily be understood that the gas turbine engine may be implemented in various environments. For example, the engine may be implemented in an aircraft, but may also be implemented in non-aircraft applications such as power generating stations, marine applications, or oil and gas production applications. Thus, the present disclosure is not limited to use in aircraft.

Further aspects of the present disclosure are provided by the subject matter of the following clauses.

A combined cycle propulsion system for a flight vehicle, the combined cycle propulsion system including a compressor-fed combustion engine, and a multi-mode supersonic engine including, an adjustable inlet section, a combustion section arranged downstream of the adjustable inlet section and including a first combustor portion having at least one rotating detonation combustor and a second combustor portion having a supersonic combustion type combustor, and an adjustable exhaust nozzle section arranged downstream of the combustion section, wherein, the at least one rotating detonation combustor functions as a pilot for the supersonic combustion type combustor.

The combined cycle propulsion system according to the preceding clause, wherein the compressor-fed combustion engine, the first combustor portion and the second combustor portion each respectively operate utilizing a first fuel type, a second fuel type different from the first fuel type, or a third fuel type different from the first fuel type and different from the second fuel type.

The combined cycle propulsion system according to any preceding clause, wherein the compressor-fed combustion engine includes an outer casing extending circumferentially about a centerline axis of the compressor-fed combustion engine, and the multi-mode supersonic engine extends circumferentially about the centerline axis and is arranged radially outward of the outer casing.

The combined cycle propulsion system according to any preceding clause, wherein the first combustion portion and the second combustion portion are arranged in a serial relationship, the second combustion portion being arranged downstream of the first combustion portion.

The combined cycle propulsion system according to any preceding clause, wherein the at least one rotating detonation combustor is a single rotating detonation combustor that extends circumferentially about the centerline axis.

The combined cycle propulsion system according to any preceding clause, wherein the first combustion portion includes a combustor bypass flow passage at the rotating detonation combustor providing a flow of bypass air from upstream of the at least one rotating detonation combustor to flow downstream of the at least one rotating detonation combustor to the second combustion portion.

The combined cycle propulsion system according to any preceding clause, wherein the first combustion portion includes a plurality of rotating detonation combustors circumferentially spaced about the centerline axis of the compressor-fed combustion engine.

The combined cycle propulsion system according to any preceding clause, wherein a plurality of bypass flow passages are provided between respective ones of plurality of rotating detonation combustors, and provide a bypass airflow therethrough to the second combustion portion.

The combined cycle propulsion system according to any preceding clause, wherein a cooling flow passage is provided between the compressor-fed combustion engine and the multi-mode supersonic engine to provide cooling to an inner wall of the multi-mode supersonic engine.

The combined cycle propulsion system according to any preceding clause, wherein a plurality of air bleed openings are arranged between the compressor-fed combustion engine and the multi-mode supersonic engine so as to provide a flow of air and/or combustion gases from the compressor-fed combustion engine to the multi-mode supersonic engine.

The combined cycle propulsion system according to any preceding clause, wherein the compressor-fed combustion engine defines a longitudinal direction along a centerline axis of the compressor-fed combustion engine, a circumferential direction about the centerline axis, and a radial direction extending from the centerline axis, the multi-mode supersonic engine is arranged radially outward of the compressor-fed combustion engine and defines a stadium shape profile, a height of the stadium shape profile extending in the radial direction and a length of the stadium shape profile extending orthogonal to both the longitudinal direction and the radial direction, and the multi-mode supersonic engine includes a plurality of rotating detonation combustors spaced apart from one another along the length of the stadium shape profile.

The combined cycle propulsion system according to any preceding clause, wherein the second combustion portion includes a plurality of fuel injectors arranged between respective ones of the plurality of rotating detonation combustors, the plurality of fuel injectors being arranged to provide a flow of fuel downstream of an outlet end of each of the rotating detonation combustors.

The combined cycle propulsion system according to any preceding clause, wherein the first combustion portion includes a plurality of first combustor portion inlet sections corresponding to respective ones of the plurality of rotating detonation combustors, and a plurality of bypass inlet sections arranged between the respective ones of the plurality of rotating detonation combustors.

The combined cycle propulsion system according to any preceding clause, wherein the adjustable inlet section includes at least one actuator, the adjustable inlet section being adjustable via the at least one actuator to adjust an inlet flow of air to the multi-mode supersonic engine based on (a) a first supersonic operation mode in which the first combustion portion is operated and the second combustion portion is not operated, (b) a second supersonic operation mode in which the second combustion portion is operated and the first combustion portion is not operated, and (c) a transitional supersonic operation mode between the first supersonic operation mode and the second supersonic operation mode in which both the first combustion portion and the second combustion portion are operating.

The combined cycle propulsion system according to any preceding clause, wherein the second combustion portion comprises a scramjet combustor, in the first supersonic operation mode, the at least one rotating detonation combustor is operating and the scramjet combustor is not operating, in the second supersonic operation mode, the scramjet combustor is operating and the at least one rotating detonation combustor is not operating, and, in the transitional supersonic operation mode, the at least one rotating detonation combustor is operating as the pilot to the scramjet combustor.

The combined cycle propulsion system according to any preceding clause, wherein the adjustable exhaust nozzle section includes at least one exhaust nozzle actuator, the adjustable exhaust nozzle section being actuated: a) in the first supersonic operation mode, to define a converging exhaust outlet, b) in the second supersonic operation mode, to define a diverging exhaust outlet, and c) in the transitional supersonic operation mode, to transition between the converging exhaust outlet and the diverging exhaust outlet.

A method of operating a combined cycle propulsion system for a flight vehicle, the combined cycle propulsion system including a compressor-fed combustion engine, and a multi-mode supersonic engine having an adjustable inlet section, a combustion section arranged downstream of the adjustable inlet section and including a first combustor portion having at least one rotating detonation combustor and a second combustor portion having a supersonic combustion type combustor, and an adjustable exhaust nozzle section arranged downstream of the combustion section, the method including operating the compressor-fed combustion engine to obtain a first operational flight state of the flight vehicle, at the first operational flight state of the flight vehicle, initiating a first transitional operation of actuating the adjustable inlet section to obtain a subsonic inlet flow of air to the first combustion portion, and initiating operation of the first combustor portion, initiating a compressor-fed combustion engine winddown operation to winddown operation of the compressor-fed combustion engine, operating the first combustor portion and actuating the adjustable inlet section and the adjustable exhaust nozzle section to obtain a second operational flight state of the flight vehicle, at the second operational flight state, initiating a second transitional operation of actuating the adjustable inlet section to obtain a supersonic inlet flow of air to the second combustion portion, and initiating operation of the second combustor portion utilizing the first combustor portion as a pilot, initiating a first combustor portion winddown operation to winddown operation of the first combustor portion, and operating the second combustor portion, the adjustable inlet section and the adjustable exhaust nozzle section to obtain a third operational flight state of the flight vehicle.

The method according to the preceding clause, wherein the first combustor portion includes at least one rotating detonation combustor, and combustion product gases generated by the at least one rotating detonation combustor are utilized as the pilot for the second combustor portion.

The method according to any preceding clause, wherein the second combustor portion comprises a scramjet combustor.

The method according to any preceding clause, wherein the first operational flight state comprises a vehicle airspeed of between Mach 0.9 and Mach 2, the second operational flight state of the flight vehicle comprises a vehicle airspeed of about Mach 3, and the third operational flight state of the flight vehicle comprises a vehicle airspeed of at least Mach 5.

Although the foregoing description is directed to some exemplary embodiments of the present disclosure, it is noted that other variations and modifications will be apparent to those skilled in the art, and may be made without departing from the spirit or scope of the disclosure. Moreover, features described in connection with one embodiment of the present disclosure may be used in conjunction with other embodiments, even if not explicitly stated above.

We claim:

1. A combined cycle propulsion system for a flight vehicle, the combined cycle propulsion system comprising:
   a compressor-fed combustion engine; and
   a multi-mode supersonic engine including, in a serial flow relationship defining a supersonic engine gas flowpath:
   an adjustable inlet section having an inlet at an upstream end of the adjustable inlet section;
   a combustion section arranged downstream of, and in fluid communication with, the adjustable inlet section and including a first combustor portion having at least one rotating detonation combustor and a second combustor portion having a supersonic combustion type combustor; and
   an adjustable exhaust nozzle section arranged downstream of, and in fluid communication with, the combustion section,
   wherein the at least one rotating detonation combustor functions as an ignition source for the supersonic combustion type combustor,
   wherein the compressor-fed combustion engine includes an outer casing extending circumferentially about a centerline axis of the compressor-fed combustion engine, and the multi-mode supersonic engine extends circumferentially about the centerline axis and is arranged radially outward of the outer casing,
   the outer casing extending from the inlet of the adjustable inlet section to the adjustable exhaust nozzle section and having an outer casing inner wall and an outer casing outer wall, the outer casing outer wall being an inner wall of the multi-mode supersonic engine extending from the inlet of the adjustable inlet section to the adjustable exhaust nozzle section, and
   a cooling airflow passage is defined between the outer casing inner wall and the outer casing outer wall from the inlet of the adjustable inlet section to the adjustable exhaust nozzle section to provide a flow of cooling air therethrough to provide cooling to the inner wall of the multi-mode supersonic engine.

2. The combined cycle propulsion system according to claim 1, wherein the compressor-fed combustion engine, the first combustor portion and the second combustor portion each respectively operate utilizing a first fuel type, a second fuel type different from the first fuel type, or a third fuel type different from the first fuel type and different from the second fuel type.

3. The combined cycle propulsion system according to claim 1, wherein the first combustor portion and the second combustor portion are arranged in a serial relationship, the second combustor portion being arranged downstream of the first combustor portion.

4. The combined cycle propulsion system according to claim 3, wherein the at least one rotating detonation combustor is a single rotating detonation combustor that extends circumferentially about the centerline axis.

5. The combined cycle propulsion system according to wherein the first combustor portion includes a combustor bypass flow passage at the single rotating detonation combustor providing a flow of bypass air from upstream of the single rotating detonation combustor to flow downstream of the single rotating detonation combustor to the second combustor portion.

6. The combined cycle propulsion system according to claim 1, wherein the at least one rotating detonation combustor of the first combustor portion includes a plurality of rotating detonation combustors circumferentially spaced about the centerline axis of the compressor-fed combustion engine.

7. The combined cycle propulsion system according to claim 6, wherein a plurality of bypass flow passages are provided between respective ones of the plurality of rotating detonation combustors, to provide a bypass airflow through the plurality of bypass flow passages to the second combustor portion.

8. The combined cycle propulsion system according to claim 1, wherein the cooling airflow passage includes a plurality of air bleed openings arranged to provide a flow of a portion of the cooling air to pass from the cooling airflow passage into component parts of the supersonic engine.

9. The combined cycle propulsion system according to wherein the adjustable inlet section includes at least one actuator, the adjustable inlet section being adjustable via the at least one actuator to adjust an inlet flow of air to the multi-mode supersonic engine based on (a) a first supersonic operation mode in which the first combustor portion is operated and the second combustor portion is not operated, (b) a second supersonic operation mode in which the second combustor portion is operated and the first combustor portion is not operated, and (c) a transitional supersonic operation mode between the first supersonic operation mode and the second supersonic operation mode in which both the first combustor portion and the second combustor portion are operating.

10. The combined cycle propulsion system according to claim 9, wherein the second combustor portion comprises a scramjet combustor; and wherein in the first supersonic operation mode, the at least one rotating detonation combustor is operating and the scramjet combustor is not operating; in the second supersonic operation mode, the scramjet combustor is operating and the at least one rotating detonation combustor is not operating; and, in the transitional supersonic operation mode, the at least one rotating detonation combustor is operating as a pilot to the scramjet combustor.

11. The combined cycle propulsion system according to claim 10, wherein the adjustable exhaust nozzle section includes at least one exhaust nozzle actuator, the adjustable exhaust nozzle section being actuated: a) in the first supersonic operation mode, to define a converging exhaust outlet, b) in the second supersonic operation mode, to define a diverging exhaust outlet, and c) in the transitional supersonic operation mode, to transition between the converging exhaust outlet and the diverging exhaust outlet.

* * * * *